(12) United States Patent
Sekiya (10) Patent No.: US 12,463,393 B2
(45) Date of Patent: Nov. 4, 2025

(54) METHOD OF OPERATING CONNECTOR UNIT OF ENDOSCOPE SYSTEM, AND ENDOSCOPE SYSTEM

(71) Applicant: OLYMPUS MEDICAL SYSTEMS CORP., Tokyo (JP)

(72) Inventor: Kei Sekiya, Sagamihara (JP)

(73) Assignee: Olympus Medical Systems Corp., Tokyo (JP)

( * ) Notice: Subject to any disclaimer, the term of this patent is extended or adjusted under 35 U.S.C. 154(b) by 259 days.

(21) Appl. No.: 18/216,657

(22) Filed: Jun. 30, 2023

(65) Prior Publication Data

US 2024/0014620 A1 Jan. 11, 2024

Related U.S. Application Data

(60) Provisional application No. 63/358,883, filed on Jul. 7, 2022.

(51) Int. Cl.
| | |
|---|---|
| *H01R 43/26* | (2006.01) |
| *A61B 1/00* | (2006.01) |
| *H01R 13/46* | (2006.01) |
| *H01R 13/627* | (2006.01) |

(52) U.S. Cl.
CPC ......... *H01R 43/26* (2013.01); *A61B 1/00103* (2013.01); *A61B 1/00124* (2013.01); *H01R 13/46* (2013.01); *H01R 13/6272* (2013.01); *H01R 2201/12* (2013.01)

(58) Field of Classification Search
CPC .... H01R 43/26; H01R 13/46; H01R 13/6272; H01R 2201/12; A61B 1/00103; A61B 1/00124
USPC .................................. 439/372, 352, 923
See application file for complete search history.

(56) References Cited

U.S. PATENT DOCUMENTS

| | | | |
|---|---|---|---|
| 8,678,850 B2 * | 3/2014 | Nagasaka | H01R 13/6272 439/378 |
| 11,329,418 B2 * | 5/2022 | Taira | G02B 6/3893 |
| 2014/0026406 A1 * | 1/2014 | Aoki | H01R 43/26 29/747 |
| 2021/0281005 A1 * | 9/2021 | Taira | G02B 6/3893 |

FOREIGN PATENT DOCUMENTS

| | | |
|---|---|---|
| JP | 2009-018059 A | 1/2009 |
| JP | 2009-153776 A | 7/2009 |
| JP | 5325401 B2 | 10/2013 |
| JP | 2021-183166 A | 12/2021 |

* cited by examiner

*Primary Examiner* — Gary F Paumen
(74) *Attorney, Agent, or Firm* — Morgan, Lewis & Bockius LLP (57) ABSTRACT

A method of operating a connector unit of an endoscope system, the method including engaging a first engagement portion of a first connector with a second engagement portion of a second connector to electrically connect a first wire to a third wire via a second wire, electrically disconnecting the first wire and the second wire, and detaching the first engagement portion from the second engagement portion. The first connector includes the first wire electrically connected to the second wire. The second connector includes the third wire.

20 Claims, 11 Drawing Sheets

METHOD OF OPERATING CONNECTOR UNIT OF ENDOSCOPE SYSTEM, AND ENDOSCOPE SYSTEM

RELATED APPLICATION DATA

This application is based on and claims priority under 35 U.S.C. § 119 to U.S. Provisional Application No. 63/358,883 filed on Jul. 7, 2022, the entire contents of which are incorporated herein by reference.

FIELD OF DISCLOSURE

Embodiments of the present disclosure relate to a method of operating a connector unit, which includes a first connector and a second connector, of an endoscope system, and an endoscope system with a connector unit including a first connector and a second connector.

BACKGROUND

An endoscope is used in such a way that an elongated insertion portion is inserted into a subject for observation of a region that is not visible from the outside, and for insertion of a treatment instrument through a treatment instrument channel of the insertion portion so that various treatments are performed using various treatment instruments protruding beyond an opening at a distal end portion of the treatment instrument channel. When a connector of the endoscope is connected to a processor, the endoscope is supplied with power from the processor, and transmits an image signal to the processor.

Japanese Patent Application Laid-Open Publication No. 2021-183166 discloses a so-called single-use endoscope adapted to be used only once. To connect a reusable endoscope (i.e., a conventional endoscope adapted to be cleaned for reuse) and a single-use endoscope to a common processor, a relay adapter is provided between a connector of the single-use endoscope and the processor.

Japanese Patent Application Laid-Open Publication No. 2009-18059 discloses a single-use endoscope (i.e., a disposable endoscope) that prevents being reused against an intention of a manufacturer.

SUMMARY OF THE DISCLOSURE

Provided is a method of operating a connector unit of an endoscope system of an embodiment of the present disclosure. The method including engaging a first engagement portion of a first connector with a second engagement portion of a second connector to electrically connect a first wire to a third wire via a second wire, electrically disconnecting the first wire and the second wire, and detaching the first engagement portion from the second engagement portion. The first connector includes the first wire electrically connected to the second wire and the second connector includes the third wire.

A connector unit of an embodiment of the present disclosure includes a first connector, and a second connector configured to be electrically connected to the first connector. The first connector includes a first housing, and a first wire and a second wire located inside the first housing. The first housing includes a first engagement portion, and a first through-hole. The first wire is connected to the second wire and at least a first portion of the second wire is located inside the first housing. The second connector includes a second housing, and a third wire located inside the second housing. The second housing includes a second engagement portion, and a second through-hole. The connector unit has a first state and a second state. In the first state, the first engagement portion is engaged with the second engagement portion, and the first wire is electrically connected to the third wire via the second wire. In the second state, the first engagement portion is detached from the second engagement portion, and the first wire is electrically disconnected from the second wire.

DETAILED DESCRIPTION

Hereinafter, embodiments of the present disclosure will be described with reference to the drawings. Note that the drawings based on the embodiments are schematic views. In each drawing, the relationship between the thickness and the width of each portion, the proportions of the thicknesses of the respective portions, and the like differ from the actual ones. Different drawings include portions with different dimensional relationships or portions with different proportions. Illustration of some of the components and assignment of reference signs to some of the components will be omitted.

First Embodiment

Figure 1:
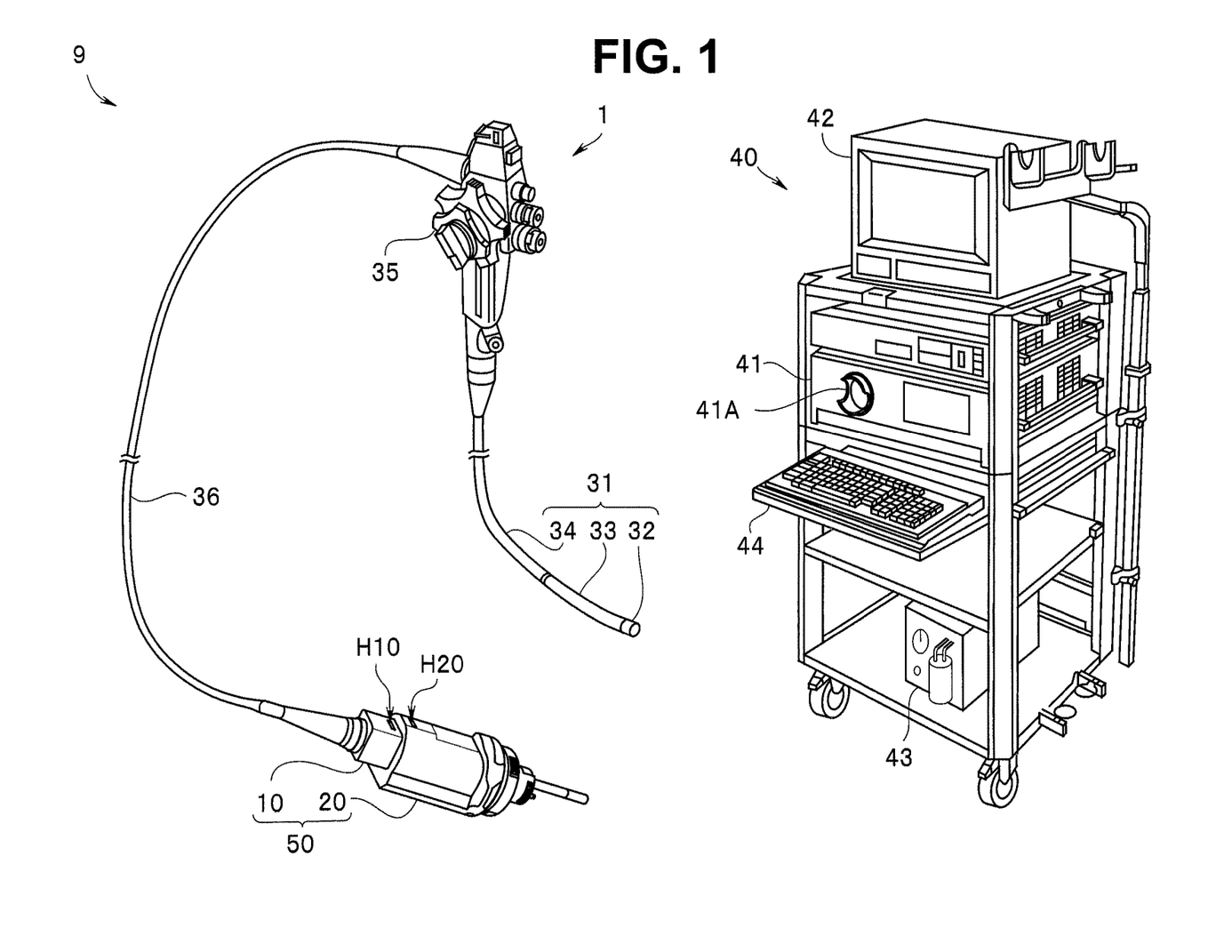
FIG. 1 is a configuration diagram of an endoscope system of a first embodiment.
Figure 2:
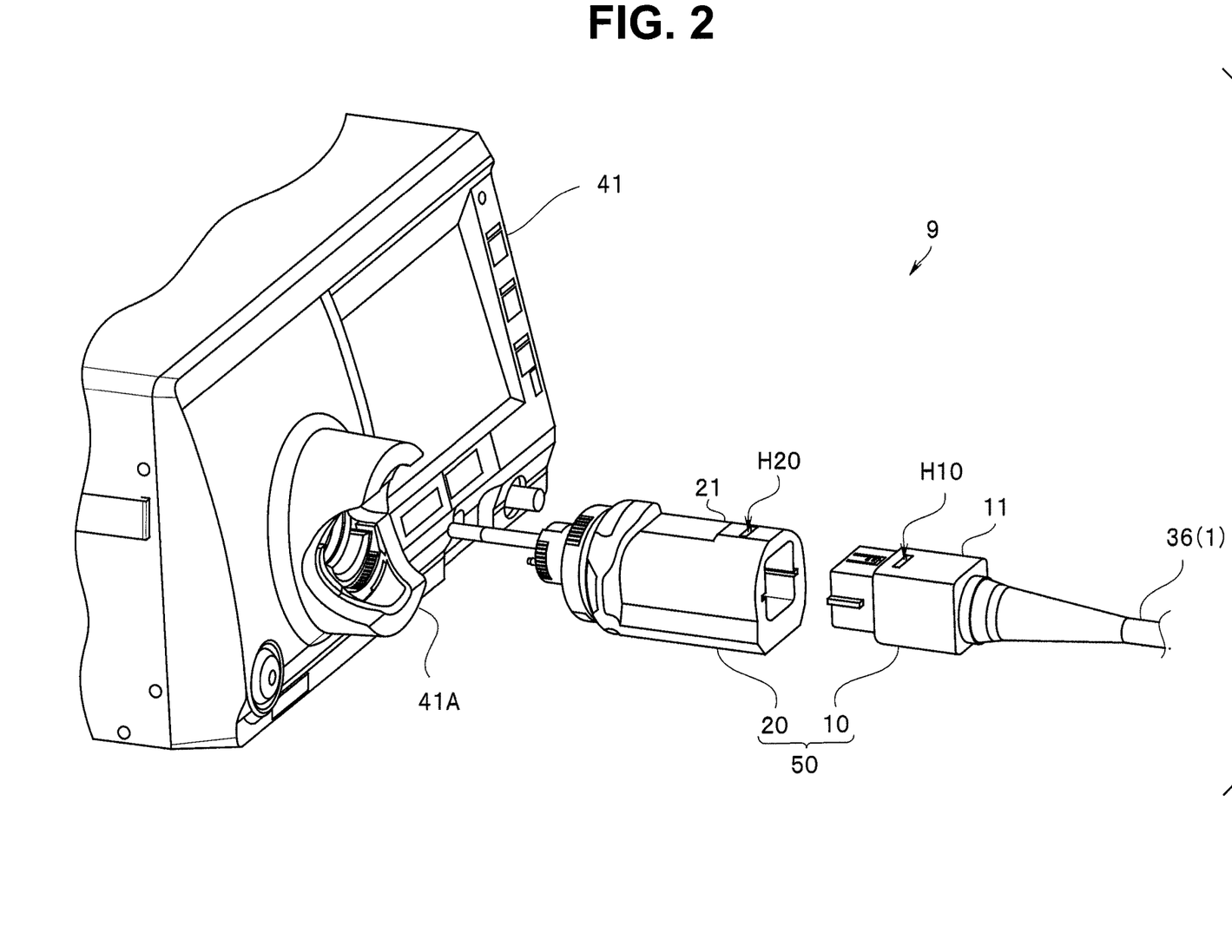
FIG. 2 is an external view of a connector unit of the endoscope system of the first embodiment.

An endoscope system 9 of the present embodiment illustrated in FIGS. 1 and 2 includes an endoscope 1 with a first connector 10, a second connector 20 as a relay adapter, and a peripheral device unit 40. The first connector 10 of the endoscope 1 and the second connector 20 form a first connector unit 50 (hereinafter referred to as a "connector unit 50"). The connector unit 50 comprises the first connector 10 and the second connector 20 configured to be electrically connected to the first connector 10.

The endoscope 1 is a so-called single-use endoscope adapted to be used only once.

The endoscope 1 has a different connection configuration with respect to a processor 41 from a so-called reusable endoscope that is adapted to be cleaned for repeated use. The second connector 20 is a relay adapter used to connect the peripheral device unit 40 (i.e., the processor 41) for reusable endoscope and the first connector 10 of the endoscope 1. The second connector 20 includes a receptacle portion adapted to be connected to the endoscope 1, and a plug portion adapted to be connected to a connector 41A of the processor 41.

The endoscope 1 includes an elongated insertion portion 31 adapted to be inserted into a subject, an operation portion 35 provided at the proximal end of the insertion portion 31, and a universal cord 36 extending from the operation portion 35. The proximal end of the universal cord 36 is provided with the first connector 10.

The operation portion 35 includes a bending operation knob, and a button for operating an endoscope function. The insertion portion 31 of the endoscope 1 includes, sequentially arranged from the distal end side, a distal end portion 32 having an image pickup unit (not illustrated), a bending portion 33 that is provided at the proximal end of the distal end portion 32 and is bendable, and an elongated flexible tube 36 provided at the proximal end of the bending portion 33.

The peripheral device unit 40 includes the processor 41, a monitor 42, a gas supply device 43 as a fluid supply device, a keyboard 44, and the like that are disposed on a mount. The processor 41 includes a third connector 41A. The processor 41 controls the entire endoscope system 9, and also processes an image signal outputted from the image pickup unit. An image processed by the processor 41 is displayed on the monitor 42. The keyboard 44 is used for a user to input data into the processor 41, for example. The gas supply device 43 supplies pressurized gas, for example, air, carbon dioxide gas, or nitrogen gas.

The foregoing configuration of the endoscope system 9 is only exemplary. Thus, the endoscope system of the present disclosure is not limited to the foregoing configuration.

To perform a test on a next patient after the single-use endoscope is used, the first connector 10 of the used endoscope 1 is removed from the second connector 20 connected to the processor 41, and then, a first connector 10 of a new endoscope is inserted into the second connector 20.

Figure 3:
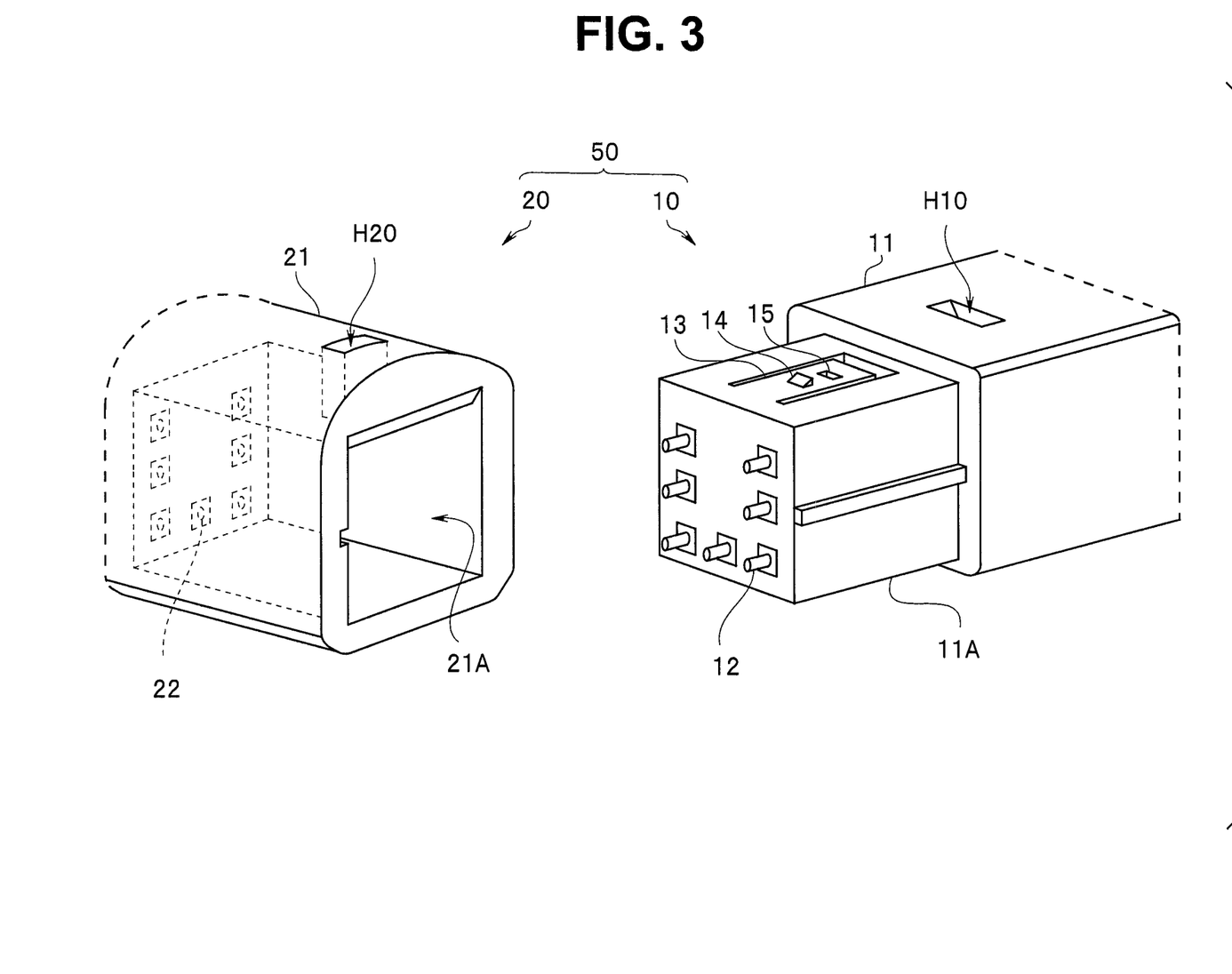
FIG. 3 is an external view of the connector unit of the endoscope system of the first embodiment.

As illustrated in FIG. 3, the first connector 10 is a plug including a plurality of projecting electric contacts 12 on the front face of a projecting portion 11A of a first housing 11. The second connector 20 is a relay adapter including a receptacle having a recess portion 21A adapted to receive the projecting portion 11A of the first connector 10.

The first housing 11 of the first connector 10 includes a first through-hole H10. A second housing 21 of the second connector 20 includes a second through-hole H20. Each of the first through-hole H10 and the second through-hole H20 may be provided with a lid for preventing intrusion of foreign matter into the housing.

The first connector 10 includes an elastic member 13 with a cantilever structure provided on the outer face of the projecting portion 11A. The elastic member 13 is a leaf spring formed by cutting out a face of the projecting portion 11A of the first housing 11. In other words, a face of the projecting portion 11A is formed of an elastic metal plate, for example.

The elastic member 13 of the first connector 10 is provided with a first projection 14 as a first engagement region or a first engagement portion (i.e., a claw). Further, the elastic member 13 includes a second recess 15 as a third engaged region or a third engagement portion (i.e., a bottom closed hole). The second recess 15 may be a through-hole of the elastic member 13. The first engagement portion 14 can be a first projection, and the second engagement portion 23 can be a first recess. The first connector 10 can include the elastic member 13, the elastic member 13 can include the first engagement portion 14, and in the first state, the elastic member 13 biases the first engagement portion 14 toward the second engagement portion 23.

Note that the second recess 15, which is the third engaged region or a third engagement portion, of the elastic member 13 is arranged at a position visible through the second through-hole H20 in a state where the first connector 10 is inserted into the second connector 20. The first connector 10 includes the third engagement portion 15, and the wire connector unit 17. In the first state, the wire connector unit 17 is visible through the first through-hole H10 from outside of the connector unit 50, and the third engagement portion 15 is visible through the second through-hole H20 from outside of the connector unit 50. The third engagement portion 15 can be a recess.

Meanwhile, the bottom face of the recess portion 21A of the second connector 20 is provided with a plurality of recessed electric contacts 22. When the first connector 10 is inserted into the second connector 20, each of the plurality of electric contacts 12 of the first connector 10 is electrically connected to each of the plurality of electric contacts 22 of the second connector 20. Note that the electric contacts 12 may be recessed (female), and the electric contacts 22 may be projecting (male).

The first connector 10 may include a light guide pipe sleeve adapted to receive illumination light from a light source, and a gas/liquid feeding pipe sleeve adapted to be supplied with a fluid from the gas supply device 43. The second connector 20 may be provided with a light guide output end adapted to be optically coupled to the light guide pipe sleeve of the first connector 10, and a gas feeding pipe adapted to be inserted into the gas/liquid feeding pipe sleeve.

Figure 4:
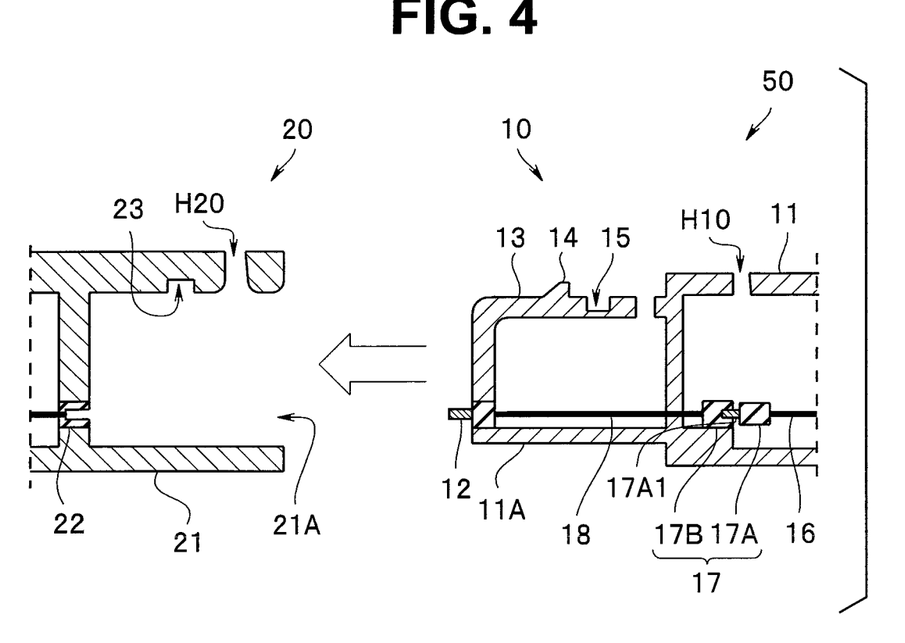
FIG. 4 is a cross-sectional view of the connector unit of the endoscope system of the first embodiment.

As illustrated in FIG. 4, the first connector 10 includes, within the first housing 11, a first electric cable or a first wire (i.e., wire) 16, a second electric cable or a second wire (i.e., wire) 18, and a second connector unit 17 (hereinafter referred to as "a cable connector unit 17" or "a wire connector unit 17") electrically connecting the first electric cable 16 and the second electric cable 18. The first connector 10 includes the first housing 11 and the first wire 16 and the second wire 18. The first housing 11 includes the first engagement portion 14, and the first through-hole H10. The first wire 16 and the second wire 18 are located inside the first housing 11, and the first wire 16 is connected to the second wire 18. At least a first portion of the second wire is located inside the first housing 11 where the first engagement portion 14 is located. The first wire 16 is electrically connected to the second wire 18 via the wire connector unit 17, and the wire connector unit 17 is located inside the first housing 11.

The cable connector unit 17 includes a plug (a first part) 17A and a receptacle (a second part) 17B. The plug 17A is connected to the first electric cable 16 extending from the endoscope 1. The receptacle 17B is connected to one of the plurality of electric contacts 12 via the second electric cable 18. The first electric cable 16 is electrically connected to the second connector 20.

The first electric cable 16 is one of a plurality of electric cables that transmit/receive signals indispensable for the operation of the endoscope 1. For example, the first electric cable 16 is an image pickup cable that outputs a video signal. The first wire 16 and the second wire 18 can be an image pickup cable configured to transmit a video signal.

The second connector 20 includes a first recess 23 as a first engaged region or a second engagement portion (i.e., a hole) provided in the inner face of the recess portion 21A of the second housing 21. When the first connector 10 is inserted into the second connector 20, the first projection 14 of the first connector 10 is so-called snap-fitted to the first recess 23 of the second connector. Thus, the first connector 10 is mechanically fixed to the second connector 20. The second connector 20 includes a second housing 21 and a third wire located inside of the second housing 21. The second housing 21 includes the second engagement portion 23, and the second through-hole H20. The connector unit 50 has a first state and a second state. In the first state, the first engagement portion 14 is engaged with the second engagement portion 23, and the first wire 16 is electrically connected to the third wire via the second wire 18, and in the second state, the first engagement portion 14 is detached from the second engagement portion 23, and the first wire 16 is electrically disconnected from the second wire 18.

The first projection 14 of the first connector 10 is fitted into and caught by the first recess 23 of the second connector 20 utilizing the elasticity of the elastic member 13 that is a leaf spring so that the first projection 14 and the first recess 23 engage with each other. Therefore, the first connector 10 becomes unremovable from the second connector 20.

Note that the holding angle (i.e., the angle of the portion to be caught) of the first projection 14 and the holding angle of the first recess 23 are 90 degrees. In contrast, the lower side of the wall surface of the second through-hole H20 in the second connector 20 is curved so as to prevent the first projection 14 from engaging with the second through-hole H20.

The first connector 10 includes a distal end portion 17A1 of the plug 17A, which is a second engaged region of the cable connector unit 17, at a position visible through the first through-hole H10. In other words, the plug 17A is not completely inserted into the receptacle 17B, and is inserted into the receptacle 17B by "half".

A single-use endoscope may possibly be reused against an intention of a manufacturer. The endoscope system 9 of the present embodiment is configured such that the first connector 10 can be removed from the second connector 20 using a dedicated detachment jig 60 (see FIG. 7), and when the first connector 10 is removed from the second connector 20, the plug 17A of the cable connector unit 17 is removed from the receptacle 17B as described below. Therefore, the endoscope 1 can no longer output an image pickup signal to the processor 41, for example. Thus, the endoscope 1 cannot be reused.

<Method of Operating Connector Unit>

A method of operating the connector unit 50 will be described with reference to a flowchart of FIG. 5.

<Step S10> Attachment of First Connector to Second Connector

Figure 5:
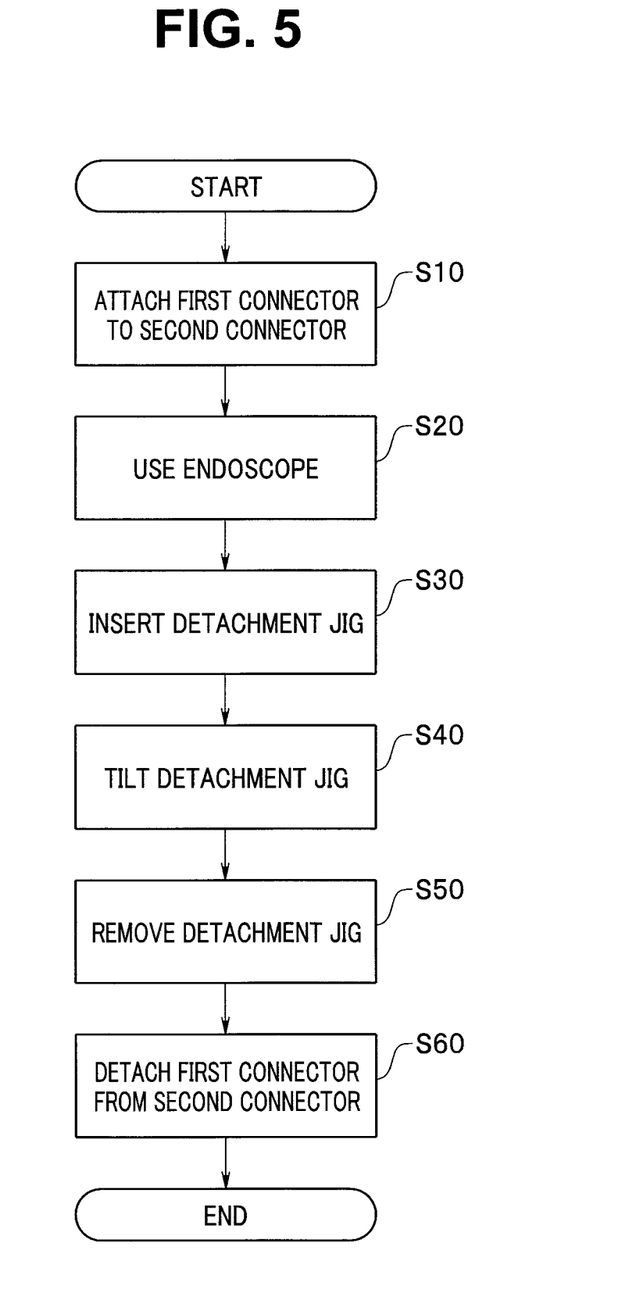
FIG. 5 is a flowchart of a method of operating the connector unit of the endoscope system of the first embodiment.
Figure 6:
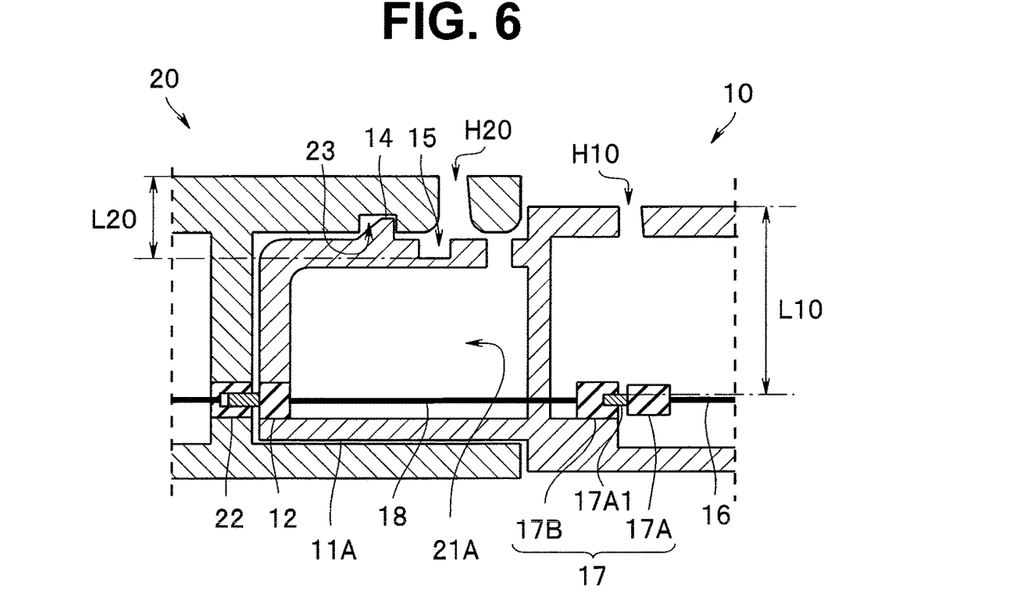
FIG. 6 is a cross-sectional view of the connector unit of the endoscope system of the first embodiment.

As illustrated in FIGS. 5 and 6, the first projection 14 of the first connector 10 is inserted into the first recess 23 of the second connector 20. Though not illustrated, the elastic member 13, which is a leaf spring, elastically deforms in the downward direction in FIG. 6. Therefore, the first projection 14 that is the first engagement region of the first connector 10 engages with the first recess 23 that is the first engaged region of the second connector 20. The first connector 10 is unremovably fixed to the second connector 20 by snap-fit. The first engagement portion 14 of a first connector 10 engages with the second engagement portion 23 of a second connector 20. The first connector 10 includes the first wire 16 electrically connected to the second wire 18, and the second connector 20 includes the third wire. Engaging the first engagement portion 14 with the second engagement portion 23 electrically connects the first wire 16 to the third wire via the second wire 18.

Note that the configurations of the elastic member 13, the first projection 14, and the first recess 23 can be appropriately selected from among known configurations as long as the first connector 10 and the second connector 20 can engage with each other by snap-fit. For example, although the elastic member 13 is a leaf spring with an I-shaped cross-section, the elastic member 13 may be a leaf spring that has a U-shaped cross-section and thus is more elastically deformable. In addition, the elastic member 13 need not be entirely formed of an elastic material, and only corner portions of the elastic member 13 may be formed of an elastic material. The shapes of the projection and the recess may also be appropriately selected.

When the first connector 10 is inserted into the second connector 20, the electric contacts 12 of the first connector 10 are electrically connected to the electric contacts 22 of the second connector 20.

Note that as illustrated in FIG. 6, a first distance L10 is longer than a second distance L20. The first distance L10 is a distance from a face of an opening of the first through-hole H10 to the distal end portion 17A1 of the plug 17A that is the second engaged region. The second distance L20 is a distance from a face of an opening of the second through-hole H20 to the second recess 15 that is the third engaged region. In the first state, a minimum distance from the first through-hole H20 to the wire connector unit 17 is the first distance L10, a minimum distance from the second through-hole H20 to the third engagement portion 15 is a second distance L20. The first distance L10 is longer than the second distance L20.

<Step S20> Use of Endoscope

The insertion portion 31 of the endoscope 1 is inserted into a subject so that observation as well as various treatments using treatment instruments are performed for a region that is not visible from the outside. When the use of the endoscope 1 is over, transfer of signals between the processor 41 and the endoscope 1 terminates.

Note that instead of using the endoscope, it is also possible to perform an operation test on the endoscope system 9, for example. In addition, a practice of an operation of attaching and detaching the connector unit 50 may be performed. During the operation test and the practice of the attaching and detaching operation, the endoscope 1 is not used. In other words, step S20 can be skipped.

<Step S30> Insertion of Detachment Jig

The first projection 14 that is the first engagement region of the first connector 10 engages with the first recess 23 that is the first engaged region of the second connector Therefore, in the endoscope system 9, even when the use of the endoscope 1 is over, the first connector 10 cannot be removed from the second connector 20.

Figure 7:
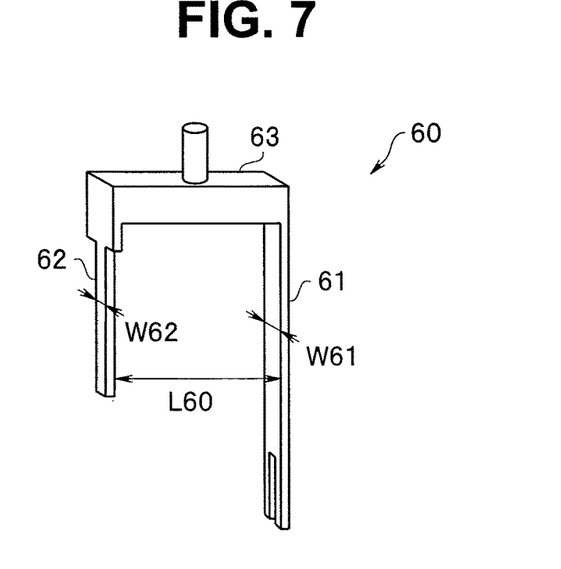
FIG. 7 is a perspective view of a detachment jig of the endoscope system of the first embodiment.

To disengage the first connector 10 and the second connector 20, the detachment jig 60 illustrated in FIG. 7 is used.

The detachment jig 60 includes a first member (a first portion of a detachment jig) 61 and a second member (a second portion of a detachment jig) 62 that are fixed to a support member 63. The first member 61 has an elongated plate shape with a width W61, has a slit at the distal end of the second member 62, and is insertable through the first through-hole H10. The second member 62 has an elongated plate shape with a width W62, and is insertable through the second through-hole H20. The first member 61 and the second member 62 are arranged in parallel. The endoscope system 9 can include the connector unit 50, and the detachment jig 60. The detachment jig includes the first portion 61 and the second portion 62, the first portion 61 of the detachment jig is configured to be inserted into the first though-hole H10 to change the connector unit 50 from the first state to the second state. The second portion 62 of the detachment jig 60 is configured to be inserted into the second though-hole H20 to change the connector unit 50 from the first state to the second state. The first portion 61 of the detachment jig 60 is configured to electrically disconnect between the first wire 16 and the second wire 18 when the first portion 61 of the detachment jig 60 is inserted into the first though-hole H10. The second portion 62 of the detachment jig 60 is configured to disconnect the first engagement portion 14 from the second engagement portion 23 when the second portion 62 of the detachment jig 60 is inserted into the second though-hole H20.

Figure 8:
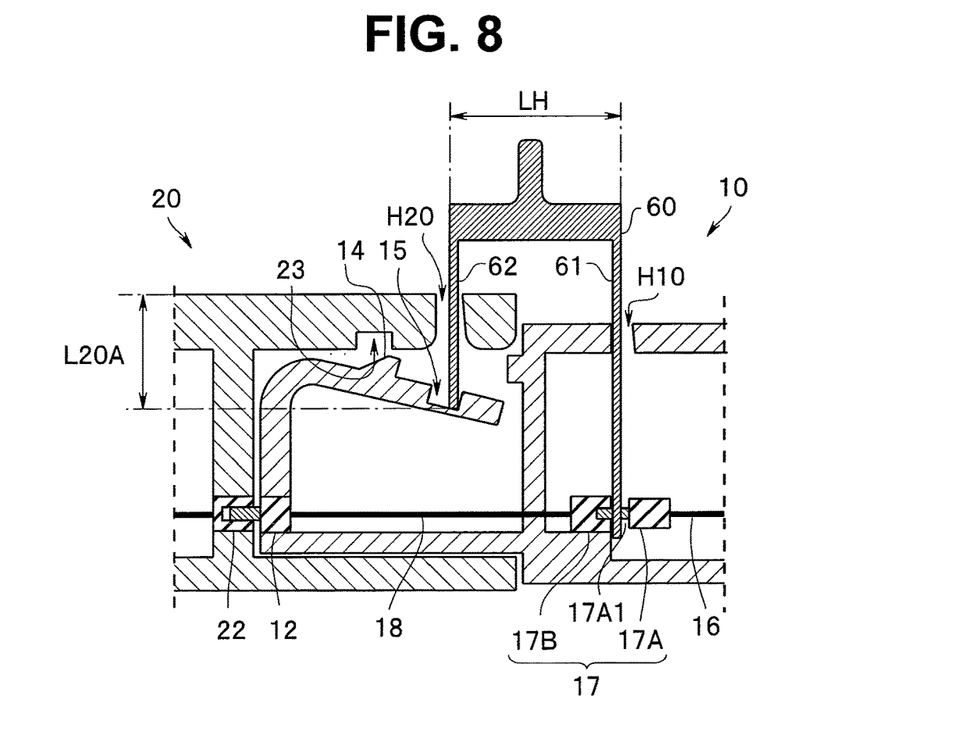
FIG. 8 is a cross-sectional view for illustrating a method of detaching the connector unit of the endoscope system of the first embodiment.

As illustrated in FIG. 8, the detachment jig 60 is inserted into the connector unit 50. The first member 61 is inserted through the first through-hole H10, and at the same time, the second member 62 is inserted through the second through-hole H20. In other words, a gap L60 between the first member 61 and the second member 62 is the same as a gap LH between the first through-hole H10 and the second through-hole H20.

When the first member 61 is inserted through the first through-hole H10, the first member 61 engages with the distal end portion 17A1 of the plug 17A that is part of the cable connector unit 17. When the second member 62 is inserted through the second through-hole H20, the second member 62 engages with the second recess 15, which is the third engaged region, of the elastic member 13, and presses the elastic member 13. As the elastic member 13 elastically deforms in the downward direction, the first projection 14, which is the first engagement region, and the first recess 23, which is the first engaged region, are disengaged. The first portion of a detachment jig 61 is inserted into the first through-hole H10 of the first connector 10, and the first wire 16 is separated from the second wire 18. The second portion of the detachment jig 62 is inserted into the second through-hole H20 of the second connector 20. A distal end portion of the second portion 62 of the detachment jig 60 engages with the third engagement portion 15 of the first connector 10. The second portion 62 of the detachment jig 60 is moved to separate the first engagement portion 14 from the second engagement portion 23. A distal end portion of the first portion 62 of the detachment jig 60 engages with the wire connector unit 17. At least a first portion of the second wire 18 is located inside the first engagement portion 10, and the wire connector unit 17 is located inside the first housing 11 of the first connector 10.

<Step S40> Tilt of Detachment Jig

In step S30, the first projection 14 and the first recess 23 are disengaged. However, when the detachment jig 60 is removed, the first projection 14 and the first recess 23 would engage with each other again due to the elastic force of the elastic member 13. Therefore, before the detachment jig 60 is removed, the first connector 10 can be moved from the second connector 20 to a small degree to a position where the first projection 14 and the first recess 23 would not engage with each other again.

Figure 9:
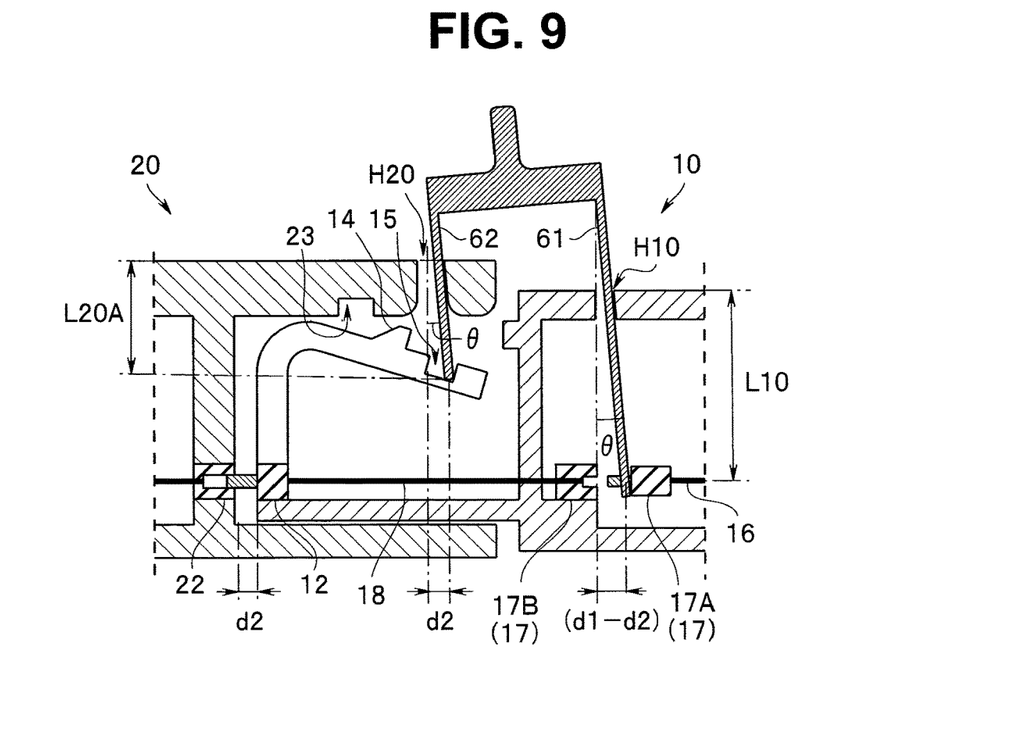
FIG. 9 is a cross-sectional view for illustrating the method of detaching the connector unit of the endoscope system of the first embodiment.

As illustrated in FIG. 9, the detachment jig 60 is tilted (i.e., rotated) in a direction in which the second connector 20 is connected to the processor 41.

When the detachment jig 60 is tilted by an angle θ, the distal end of the second member 62, which has been inserted into the connector unit 50, moves in the removal direction by a length d2 (≈L20A×tan θ). Reference sign "L20A" indicates a length from an opening of the second through-hole H20 to the distal end of the second member 62. In FIG. 9, L20A>>L20, but in the actual connector unit 50, L20A≈L20.

Therefore, the first connector 10, which includes the second recess 15 as the third engaged region that engages with the distal end of the second member 62, also moves with respect to the second connector 20. The length d2 is the amount of movement up to the position where the first projection 14 and the first recess 23 would not engage with each other again. The length d2 is greater than 1 mm and less than or equal to 10 mm, for example.

When the detachment jig 60 is tilted by the angle θ, the distal end of the first member 61 also moves with respect to the second connector 20 in the removal direction by a length d1 (≈L10×tan θ). Since L10>L20, d1>d2. The distal end of the first member 61 moves with respect to the cable connector unit 17 by a length (d1−d2).

Therefore, the plug 17A of the cable connector unit 17 is removed from the receptacle 17B. In other words, the length of the plug 17A inserted in the receptacle 17B is set to less than (d1−d2).

Note that the first distance L10 can be greater than 1.5 times and less than 10 times the second distance L20. As long as the detachment jig 60 is within the foregoing range, unintended fall of the plug 17A can be prevented because the length of the plug 17A inserted in the receptacle 17B is long.

As described above, when the detachment jig 60 is tilted, the first connector 10 moves to the position where the first projection 14 and the first recess 23 would not engage with each other again, and at the same time, the first electric cable 16 and the second electric cable 18 are electrically disconnected. The distal end portion of the detachment jig 60 is moved to separate a first part 17A of the wire connector unit 17 from a second part 17B of the wire connector unit 17. The inserted first portion 61 of the detachment jig 60 is tilted with respect to the first though-hole H10 to separate the first wire 16 from the second wire 18. The inserted second portion 62 of the detachment jig 60 is tilted with respect to the second though-hole H20 to separate the first engagement portion 14 from the second engagement portion 23.

<Step S50> Removal of Detachment Jig

Figure 10:
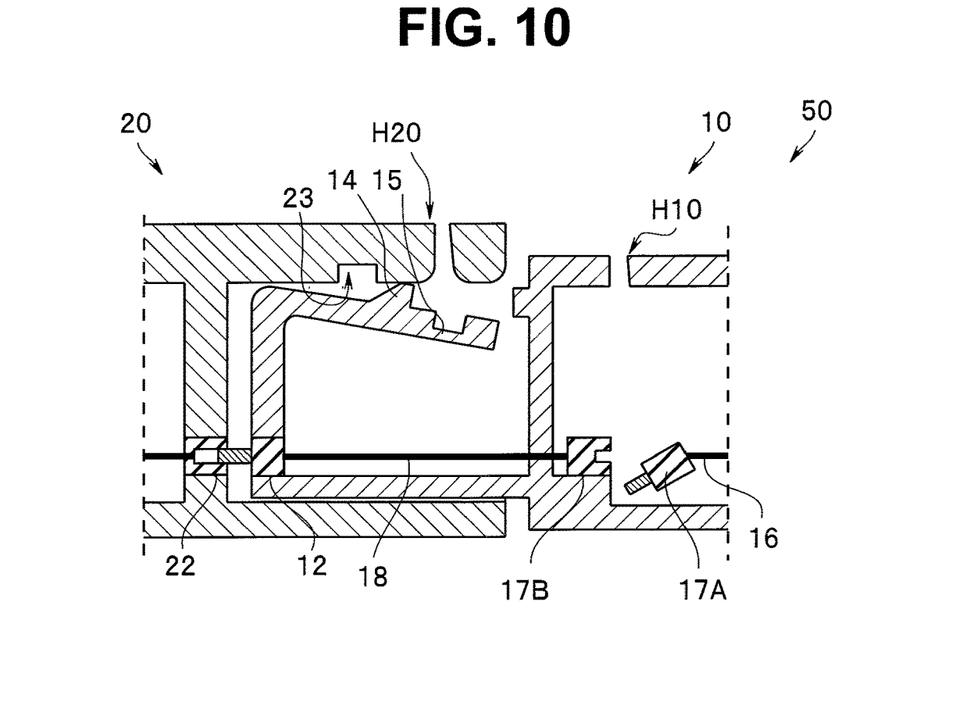
FIG. 10 is a cross-sectional view for illustrating the method of detaching the connector unit of the endoscope system of the first embodiment.

As illustrated in FIG. 10, the detachment jig 60 is removed from the first through-hole H10 and the second through-hole H20. Then, the first connector 10 is at a position not engaging with the second connector 20, and the plug 17A is out of the receptacle 17B.

<Step S60> Detachment of First Connector from Second Connector

Figure 11:
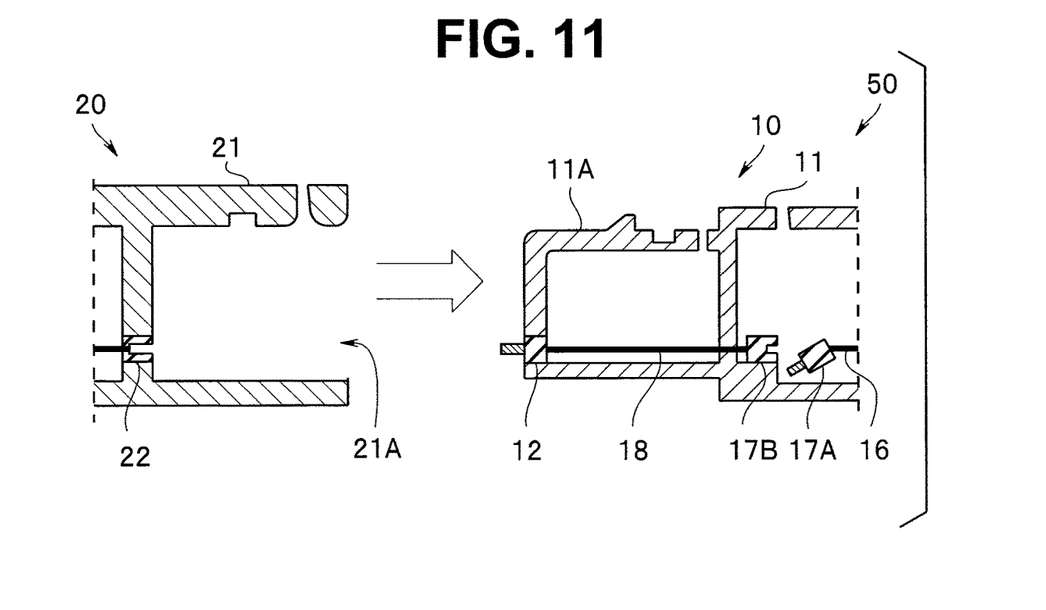
FIG. 11 is a cross-sectional view for illustrating the method of detaching the connector unit of the endoscope system of the first embodiment.

As illustrated in FIG. 11, the first connector 10 is removed from the second connector 20. The first wire 16 is electrically disconnected from the second wire 18, and the first engagement portion 14 is detached from the second engagement portion 23. The detaching the first engagement portion 14 from the second engagement portion 23 detaches the second wire 18 from the third wire.

Note that as described above, a subject that performs the method of operating the connector unit 50 is a user. However, the method may be automatically performed using a machine for attaching and detaching the connector unit 50.

The endoscope 1 removed from the second connector 20 is not able to output an image pickup signal to the processor 41 any longer. Since the cable connector unit 17 is within the first housing 11, it would be difficult for the user to insert the plug 17A into the receptacle 17B again. Therefore, the endoscope system 9 can prevent the endoscope 1 from being reused by the user against an intention of a manufacturer.

Since the manufacturer is able to disassemble the endoscope 1 that has been used and collected, the plug 17A can be easily inserted into the receptacle 17B. Therefore, the manufacturer may replace, check, and reuse parts of the endoscope 1.

The wires of the cable connector unit 17 are not limited to the foregoing electric cables each including a conductor covered with an insulator as long as such wires are electrically disconnected when the detachment jig 60 is tilted. The wires of the cable connector unit 17 may be some of wires of a flexible wiring board, or some of wires of a rigid wiring board. The wire connector unit may be a unit in which part (i.e., a plug or a receptacle) of a connector is connected to a circuit board, other than the foregoing cable connector unit.

Figure 12A:
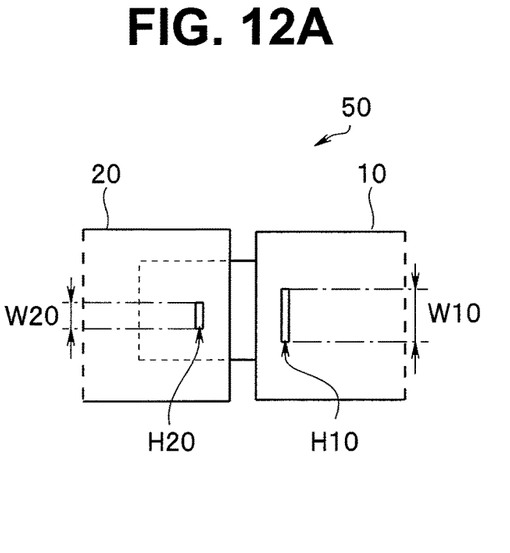
FIG. 12A is a top view of the connector unit of the endoscope system of the first embodiment.

Note that as illustrated in FIG. 12A, in the endoscope system 9, the width W10 of the first through-hole H10 is greater than the width W20 of the second through-hole H20. The width W61 of the first member 61 is slightly smaller than the width W10 of the first through-hole H10. The width W62 of the second member 62 is slightly smaller than the width W20 of the second through-hole H20.

The first member 61 is not insertable through the second through-hole H20. Therefore, the user is not able to insert the first member 61 through the second through-hole H20 to disengage the first connector 10 and the second connector 20.

Figure 12B:
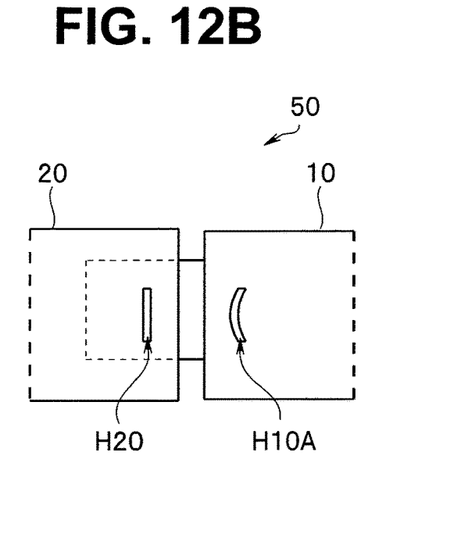
FIG. 12B is a top view of a connector unit of an endoscope system of a modification of the first embodiment.

As illustrated in FIG. 12B, the shape of the first through-hole H10 may be different from the shape of the second through-hole H20. The first member 61 is not flat but is curved. The first through-hole H10 has a first shape, the second through-hole H20 has a second shape, and the first shape is different from the second shape in one or more of geometry, size, and orientation.

Modifications of First Embodiment

An endoscope system of a modification is similar to the endoscope system 9, and thus has the same effects as the endoscope system 9. Therefore, components with the same function are denoted by the same reference sign, and repeated description will be omitted.

Figure 13:
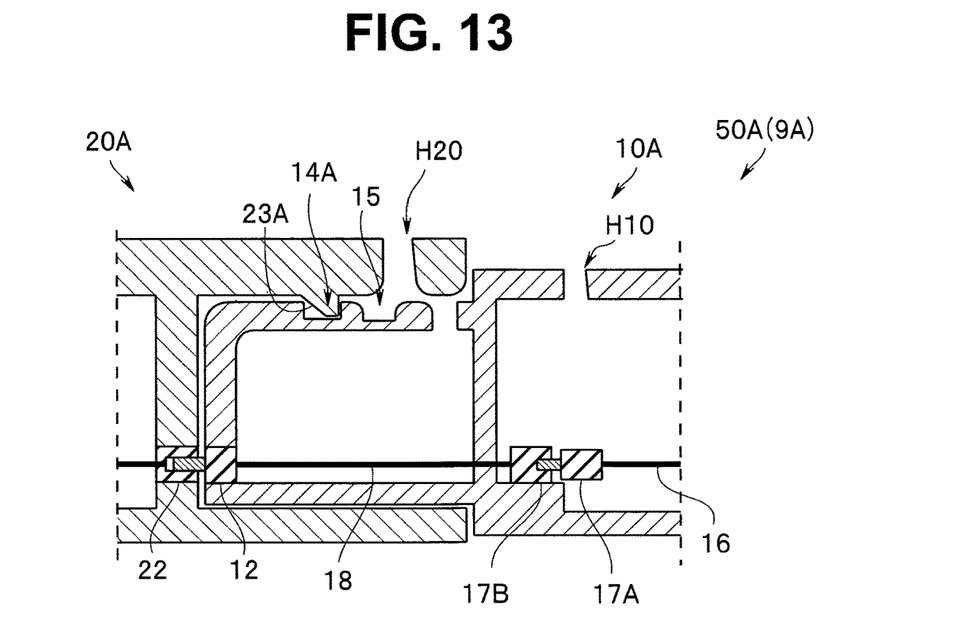
FIG. 13 is a cross-sectional view of the connector unit of the endoscope system of the modification of the first embodiment.

As illustrated in FIG. 13, in an endoscope system 9A (i.e., a connector unit 50A) of the present modification, a first engagement region of a first connector 10A is a recess 14A. A first engagement region of a second connector 20A is a projection 23A. When the recess 14A, which is the first engagement region, and the projection 23A, which is the first engaged region, engage with each other, the first connector 10A is unremovable from the second connector 20. The first engagement portion 14 can be a first recess, and the second engagement portion 23 can be a first projection.

When the first connector 10A is inserted into the second connector 20A, there is no possibility that the first engagement region of the first connector 10A will engage with the through-hole H20 of the second connector 20A. Therefore, the endoscope system 9A has higher workability than the endoscope system 9.

Figure 14:
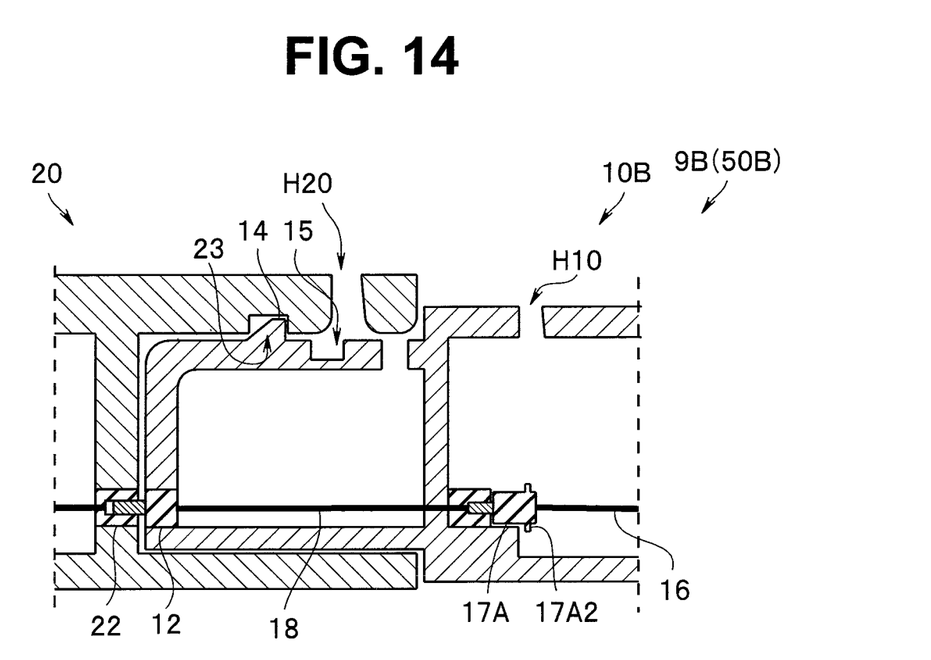
FIG. 14 is a cross-sectional view of the connector unit of the endoscope system of the modification of the first embodiment.

As illustrated in FIG. 14, in an endoscope system 9B (i.e., a connector unit 50B) of the present modification, a second engaged region 17A2 of a cable connector unit 17 of a first connector 10B is a ring-shaped projection provided on the outer face of a plug 17A.

In the endoscope system of the present disclosure, all of the engagement regions and all of the engaged regions may be either recesses or projections as long as such regions can engage with each other. For example, the third engaged region of the first connector may be a projection, and the second engaged region may be a recess in the outer face of the plug 17A.

Second Embodiment

An endoscope system 9C of the present embodiment is similar to the endoscope system 9, and thus has the same effects as the endoscope system 9. Therefore, components with the same function are denoted by the same reference sign, and repeated description will be omitted.

Figure 15:
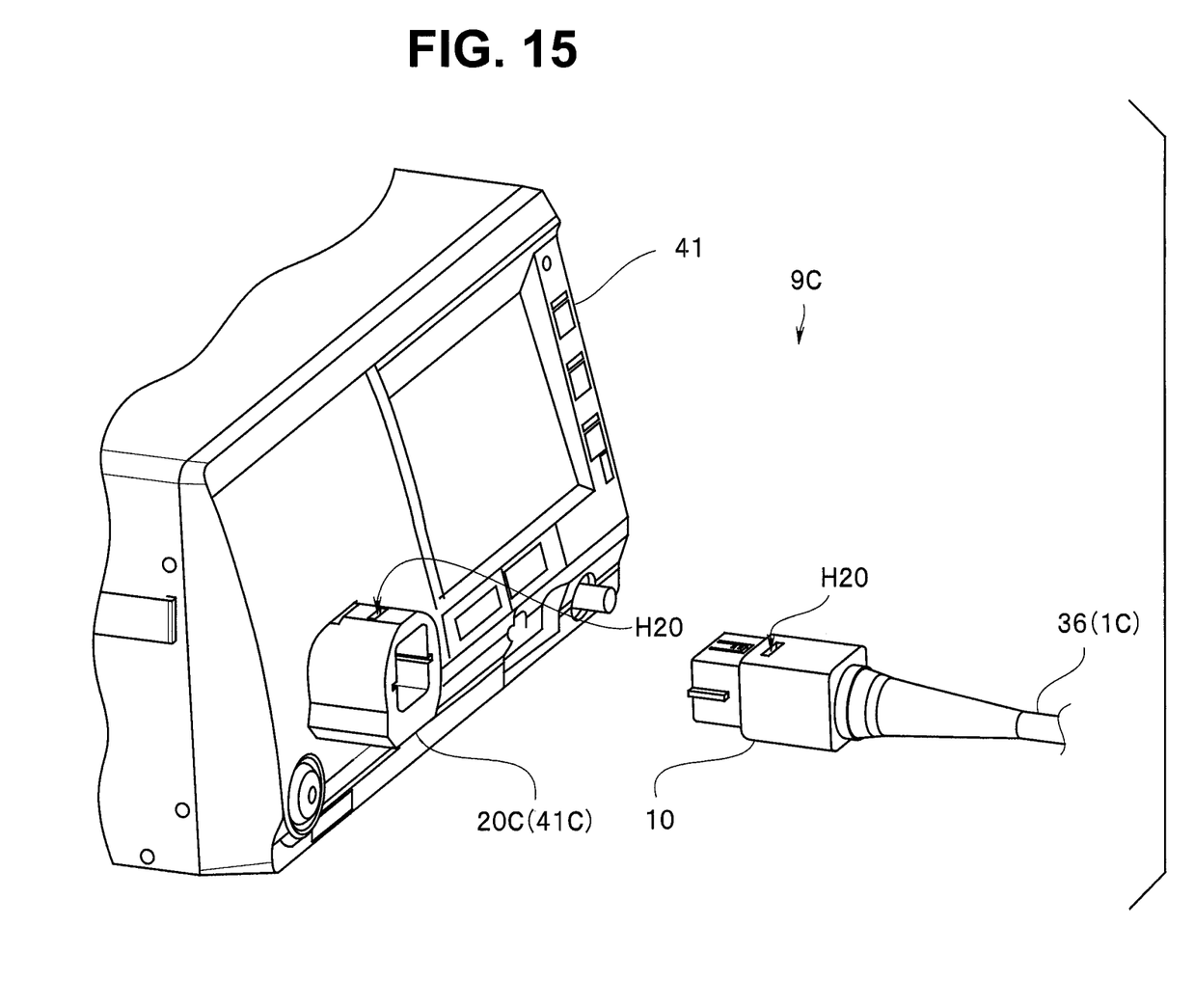
FIG. 15 is an external view of a connector unit of an endoscope system of a second embodiment.

In the endoscope system 9C illustrated in FIG. 15, a second connector 20C (41C) is included in the processor 41. In other words, the first connector 10 of the endoscope 1 is inserted into the second connector 20C of the processor 41. The connector unit 50 can include a relay adapter. The second connector 20 is provided at the relay adapter, and the relay adapter is configured to electrically connect the endoscope 1 and the processor 41. The endoscope system 9 can include the connector unit 50, the processor 41, and the second connector 20C is located at the processor 41.

In the foregoing embodiments, the endoscope 1 is a single-use endoscope that is discarded after being used only once, but may be a reusable endoscope that is used repeatedly. Although the endoscope 1 is a flexible scope that has flexibility in the insertion portion 31, the endoscope 1 may be a rigid scope including a rigid straight pipe as the insertion portion. Further, the endoscope 1 and the like are not limited to the ones for medical use, and may be the ones for industrial use. The endoscope is a single-use endoscope that is disposed of after being used once.

The present disclosure is not limited to the embodiment explained above. Various changes, alterations, and the like are possible within a range not changing the gist of the disclosure.

Example 1. A method of operating a connector unit of an endoscope system, the connector unit including:
  a first connector of an endoscope, and a second connector configured to electrically connect the first connector and a processor, wherein
  the first connector includes a first housing including a first through-hole, and the second connector includes a second housing including a second through-hole, and
  the first connector includes, within the first housing, a wire connector unit configured to electrically connect a first wire extending from the endoscope and a second wire connected to the second connector,
  the method comprising:
  attaching the first connector to the second connector, and engaging a first engagement region of an elastic member of the first connector with a first engaged region of the second connector, thereby causing the first connector to become undetachable from the second connector;
  inserting a first member of a detachment jig through the first through-hole to engage the first member with a second engaged region of the wire connector unit, and simultaneously, inserting a second member of the detachment jig through the second through-hole to engage the second member with a third engaged region of the elastic member, so that the second member presses the elastic member to disengage the first engagement region and the first engaged region;

tilting the detachment jig to cause the first connector to move to a position where the first engagement region and the first engaged region do not engage with each other again, and simultaneously, electrically disconnecting the first wire and the second wire; and removing the detachment jig from the first through-hole and the second through-hole, and detaching the first connector from the second connector.

Example 2. The method of operating the connector unit of the endoscope system according to Example 1, wherein the first member is not insertable through the second through-hole.

Example 3. The method of operating the connector unit of the endoscope system according to Example 1, wherein
the first engaged region is a first recess in an inner face of the second housing,
the second engaged region is part of a plug of the wire connector unit, and
the third engaged region is a second recess in the elastic member 13.

Example 4. The method of operating the connector unit of the endoscope system according to Example 1, wherein in a state where the first connector is attached to the second connector, a first distance from the first through-hole to the second engaged region is longer than a second distance from the second through-hole to the third engaged region.

Example 5. The method of operating the connector unit of the endoscope system according to Example 1, wherein the first wire is an image pickup cable configured to output a video signal.

Example 6. The method of operating the connector unit of the endoscope system according to Example 1, wherein the second connector is included in a relay adapter, the relay adapter being configured to electrically connect the endoscope and the processor.

Example 7. The method of operating the connector unit of the endoscope system according to Example 1, wherein the second connector is included in the processor.

Example 8. The method of operating the connector unit of the endoscope system according to Example 1, wherein the endoscope is a single-use endoscope adapted to be discarded after being used only once.

Example 9. An endoscope system comprising:
an endoscope including a first connector; and
a second connector configured to electrically connect the first connector and a processor, wherein
the first connector includes a first housing including a first through-hole, and the second connector includes a second housing including a second through-hole,
when the first connector is attached to the second connector, a first engagement region of the first connector engages with a first engaged region of an elastic member of the second connector, so that the first connector becomes undetachable from the second connector, and
the first connector includes, within the first housing, a wire connector unit configured to electrically connect a first wire extending from the endoscope and a second wire connected to the second connector.

Example 10. The endoscope system according to Example 9, further comprising a detachment jig for disengaging the first connector and the second connector, wherein
in a state where the first connector is attached to the second connector, the wire connector unit of the first connector includes a second engaged region engaging with a first member of the detachment jig at a position visible through the first through-hole, and
the elastic member of the first connector includes a third engaged region engaging with a second member of the detachment jig at a position visible through the second through-hole.

Example 11. The endoscope system according to Example 10, wherein
the first engagement region is a first projection provided on an elastic member with a cantilever structure provided on an outer face of the first housing, and
the first engaged region is a first recess in an inner face of the second housing.

Example 12. The endoscope system according to Example 10, wherein
the third engaged region is a second recess in the elastic member, and
the second engaged region is a third recess in a plug of the wire connector unit.

Example 13. The endoscope system according to Example 10, wherein in a state where the first connector is attached to the second connector, a first distance from the first through-hole to the second engaged region is longer than a second distance from the second through-hole to the third engaged region.

Example 14. The endoscope system according to Example 10, wherein
the first member is insertable through the first through-hole, and
the second member is insertable through the second through-hole, but the first member is not insertable through the second through-hole.

Example 15. The endoscope system according to Example 9, wherein the first wire is an image pickup cable configured to output a video signal.

Example 16. The endoscope system according to Example 9, wherein the second connector is included in a relay adapter, the relay adapter being configured to electrically connect the endoscope and the processor.

Example 17. The endoscope system according to Example 9, wherein the second connector is included in the processor.

Example 18. The endoscope system according to Example 9, wherein the endoscope is a single-use endoscope adapted to be discarded after being used only once.

What is claimed is:

1. A method of operating a connector unit of an endoscope system, the method comprising:
engaging a first engagement portion of a first connector with a second engagement portion of a second connector, wherein the first connector includes a first wire electrically connected to a second wire and the second connector includes a third wire and wherein engaging the first engagement portion with the second engagement portion electrically connects the first wire to the third wire via the second wire;
electrically disconnecting the first wire and the second wire; and
detaching the first engagement portion from the second engagement portion.

2. The method of operating the connector unit of the endoscope system according to claim 1, wherein electrically disconnecting the first wire and the second wire includes:
  inserting a first portion of a detachment jig into a first through-hole of the first connector, and
  separating the first wire from the second wire, and
  wherein detaching the first engagement portion from the second engagement portion includes:
  inserting a second portion of the detachment jig into a second through-hole of the second connector.

3. The method of operating the connector unit of the endoscope system according to claim 2, wherein detaching the first engagement portion from the second engagement portion further includes:
  engaging a distal end portion of the second portion of the detachment jig with a third engagement portion of the first connector, and
  moving the second portion of the detachment jig to separate the first engagement portion from the second engagement portion.

4. The method of operating the connector unit of the endoscope system according to claim 2, wherein the first wire is electrically connected to the second wire via a wire connector unit,
  wherein detaching the first engagement portion from the second engagement portion further includes:
  engaging a distal end portion of the first portion of the detachment jig with the wire connector unit, and
  moving the distal end portion of the detachment jig to separate a first part of the wire connector unit from a second part of the wire connector unit,
  wherein at least a first portion of the second wire is located inside the first engagement portion, and
  wherein the wire connector unit is located inside a first housing of the first connector.

5. The method of operating the connector unit of the endoscope system according to claim 2, wherein electrically disconnecting the first wire and the second wire further includes:
  tilting the inserted first portion of the detachment jig with respect to the first though-hole to separate the first wire from the second wire, and
  wherein the detaching the first engagement portion from the second engagement portion further includes:
  tilting the inserted second portion of the detachment jig with respect to the second though-hole to separate the first engagement portion from the second engagement portion.

6. The method of operating the connector unit of the endoscope system according to claim 1, wherein detaching the first engagement portion from the second engagement portion detaches the second wire from the third wire.

7. A connector unit, comprising:
  a first connector; and
  a second connector configured to be electrically connected to the first connector,
  wherein the first connector includes:
  a first housing including a first engagement portion, and a first through-hole; and
  a first wire and a second wire located inside the first housing, wherein the first wire is connected to the second wire and wherein at least a first portion of the second wire is located inside the first housing,
  wherein the second connector includes:
  a second housing including a second engagement portion, and a second through-hole; and
  a third wire located inside the second housing,
  wherein the connector unit has a first state and a second state, and
  wherein:
  in the first state, the first engagement portion is engaged with the second engagement portion, and the first wire is electrically connected to the third wire via the second wire, and
  in the second state, the first engagement portion is detached from the second engagement portion, and the first wire is electrically disconnected from the second wire.

8. The connector unit according to claim 7, wherein the first wire is electrically connected to the second wire via a wire connector unit, and
  wherein the wire connector unit is located inside the first housing.

9. An endoscope system, comprising:
  the connector unit according to claim 7, and
  a detachment jig,
  wherein the detachment jig includes a first portion and a second portion,
  wherein the first portion of the detachment jig is configured to be inserted into the first though-hole to change the connector unit from the first state to the second state, and
  wherein the second portion of the detachment jig is configured to be inserted into the second though-hole to change the connector unit from the first state to the second state.

10. The endoscope system according to claim 9, wherein the first portion of the detachment jig is configured to electrically disconnect between the first wire and the second wire when the first portion of the detachment jig is inserted into the first though-hole, and
  wherein the second portion of the detachment jig is configured to disconnect the first engagement portion from the second engagement portion when the second portion of the detachment jig is inserted into the second though-hole.

11. The connector unit according to claim 7, wherein the first wire is electrically connected to the second wire via a wire connector unit,
  wherein the first connector further includes:
  a third engagement portion, and
  the wire connector unit, and
  wherein in the first state, the wire connector unit is visible through the first through-hole from outside of the connector unit, and the third engagement portion is visible through the second through-hole from outside of the connector unit.

12. The connector unit according to claim 11, wherein the third engagement portion is a recess.

13. The connector unit according to claim 11, wherein, in the first state:
  a minimum distance from the first through-hole to the wire connector unit is a first distance,
  a minimum distance from the second through-hole to the third engagement portion is a second distance, and
  the first distance is longer than the second distance.

14. The connector unit according to claim 7, wherein the first engagement portion is a first projection, and
  wherein the second engagement portion is a first recess.

15. The connector unit according to claim 7, wherein the first connector includes an elastic member,
  wherein the elastic member includes the first engagement portion, and wherein, in the first state, the elastic member biases the first engagement portion toward the second engagement portion.

16. The connector unit according to claim 7, wherein the first through-hole has a first shape, the second through-hole has a second shape, and the first shape is different from the second shape in one or more of geometry, size, and orientation.

17. The connector unit according to claim 7, wherein the first wire and the second wire are an image pickup cable configured to transmit a video signal.

18. The connector unit according to claim 7, further comprising:
a relay adapter,
wherein the second connector is provided at the relay adapter, and
wherein the relay adapter is configured to electrically connect an endoscope and a processor.

19. An endoscope system, comprising:
the connector unit according to claim 7, and
a processor, and
wherein the second connector is located at the processor.

20. An endoscope system, comprising:
the connector unit according to claim 7, and
an endoscope,
wherein the first connector is located at the endoscope, and
wherein the endoscope is a single-use endoscope.

* * * * *